United States Patent [19]

Walser

[11] 4,430,930
[45] Feb. 14, 1984

[54] COATED FOOD FRYER

[75] Inventor: Glenn E. Walser, Lubbock, Tex.

[73] Assignee: Automated Food Systems, Inc., Duncanville, Tex.

[21] Appl. No.: 464,618

[22] Filed: Feb. 7, 1983

Related U.S. Application Data

[62] Division of Ser. No. 893,011, Apr. 3, 1978, Pat. No. 4,379,795.

[51] Int. Cl.³ .......................................... A47J 37/12
[52] U.S. Cl. ...................................... 99/331; 29/798;
  99/352; 99/355; 99/404; 99/407; 99/420;
  99/441; 118/28; 118/23; 227/120
[58] Field of Search ................. 29/798, 809; 99/331,
  99/352, 355, 404, 403, 407, 419, 420, 441;
  118/28, 23; 227/120; 198/339; 426/134, 302

[56] References Cited

U.S. PATENT DOCUMENTS

| | | | |
|---|---|---|---|
| 1,706,491 | 3/1929 | Jenkins | 426/134 |
| 1,960,456 | 5/1934 | Robb | 118/28 X |
| 2,532,009 | 11/1950 | Clay | 99/420 X |
| 2,552,621 | 5/1951 | Clay | 99/420 |
| 2,585,364 | 2/1952 | Wright et al. | 426/302 |
| 2,903,996 | 9/1959 | Schwebs | 118/23 X |
| 3,242,249 | 3/1966 | Nouel | 29/559 |
| 3,316,010 | 4/1967 | Lowrance | 99/419 |
| 3,563,160 | 2/1971 | Otsuka | 99/420 X |
| 3,648,625 | 3/1972 | Glass | 118/23 X |
| 3,804,955 | 4/1974 | Chow | 426/134 X |
| 3,948,160 | 4/1976 | Stickle | 99/404 |
| 4,069,960 | 1/1978 | Lowrance | 227/120 |
| 4,080,716 | 3/1978 | Dorp | 29/559 |
| 4,130,936 | 12/1978 | Cottrell | 29/798 |

Primary Examiner—Billy J. Wilhite
Attorney, Agent, or Firm—Wendell Coffee

[57] ABSTRACT

A machine for preparing and cooking corn dogs which are batter coated weiners upon a stick has a fry tank and coating bin mounted on a frame. Food articles are impaled by sticks driven through clasps in holes in a stick clamp. The food articles are dipped into a coating substance by elevation of the coating bin. The articles are elevated by rotating or flipping them above the lip of the fry tank and immersed in hot grease within the fry tank, cooked, and then elevated by rotating or flipping them out of the fry tank. The sticks are unclasped from the stick clamps and placed on a receiving tray. Thermostatically controlled heating elements suspended above the floor of the tank heat the grease.

12 Claims, 21 Drawing Figures

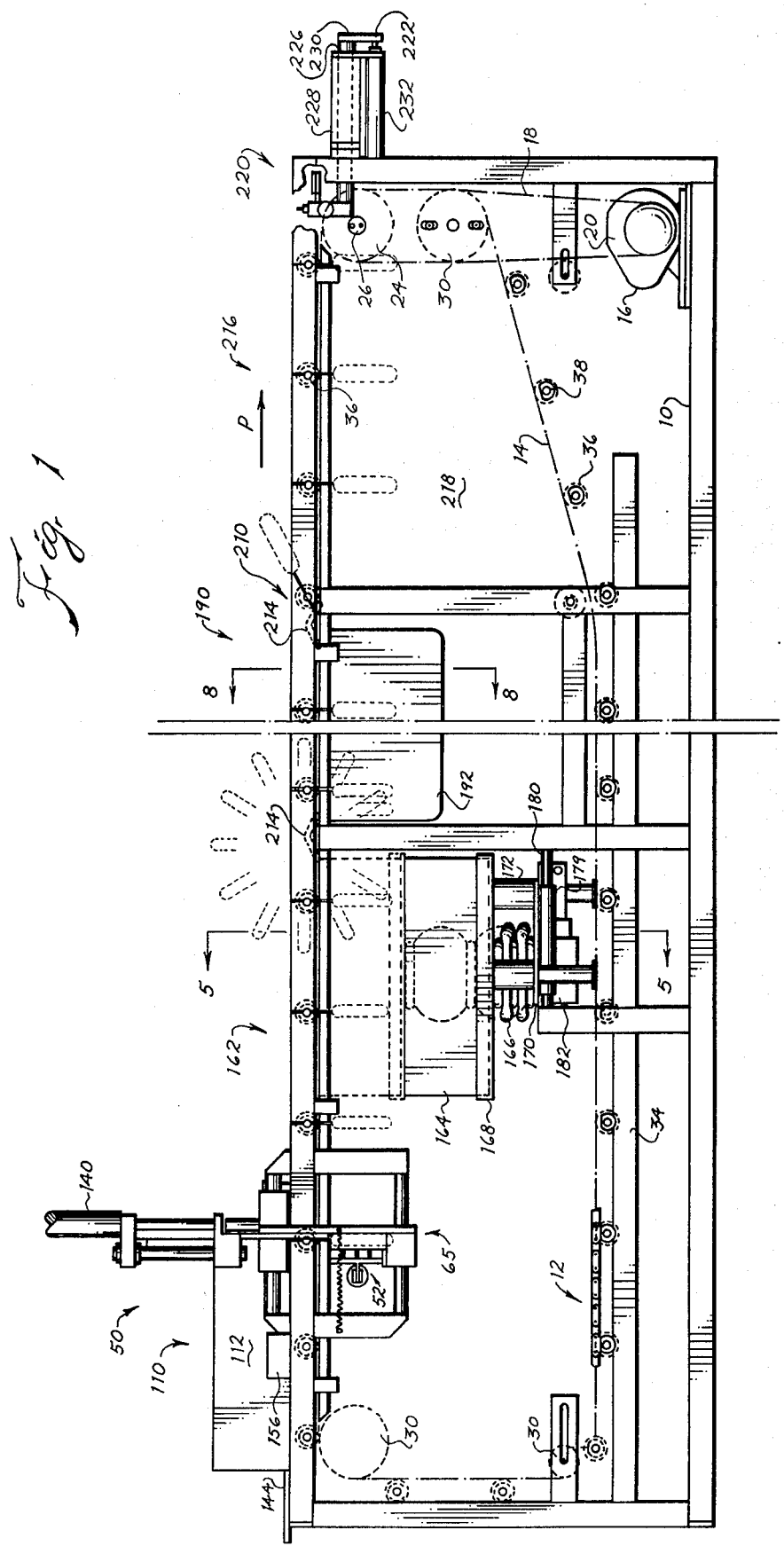

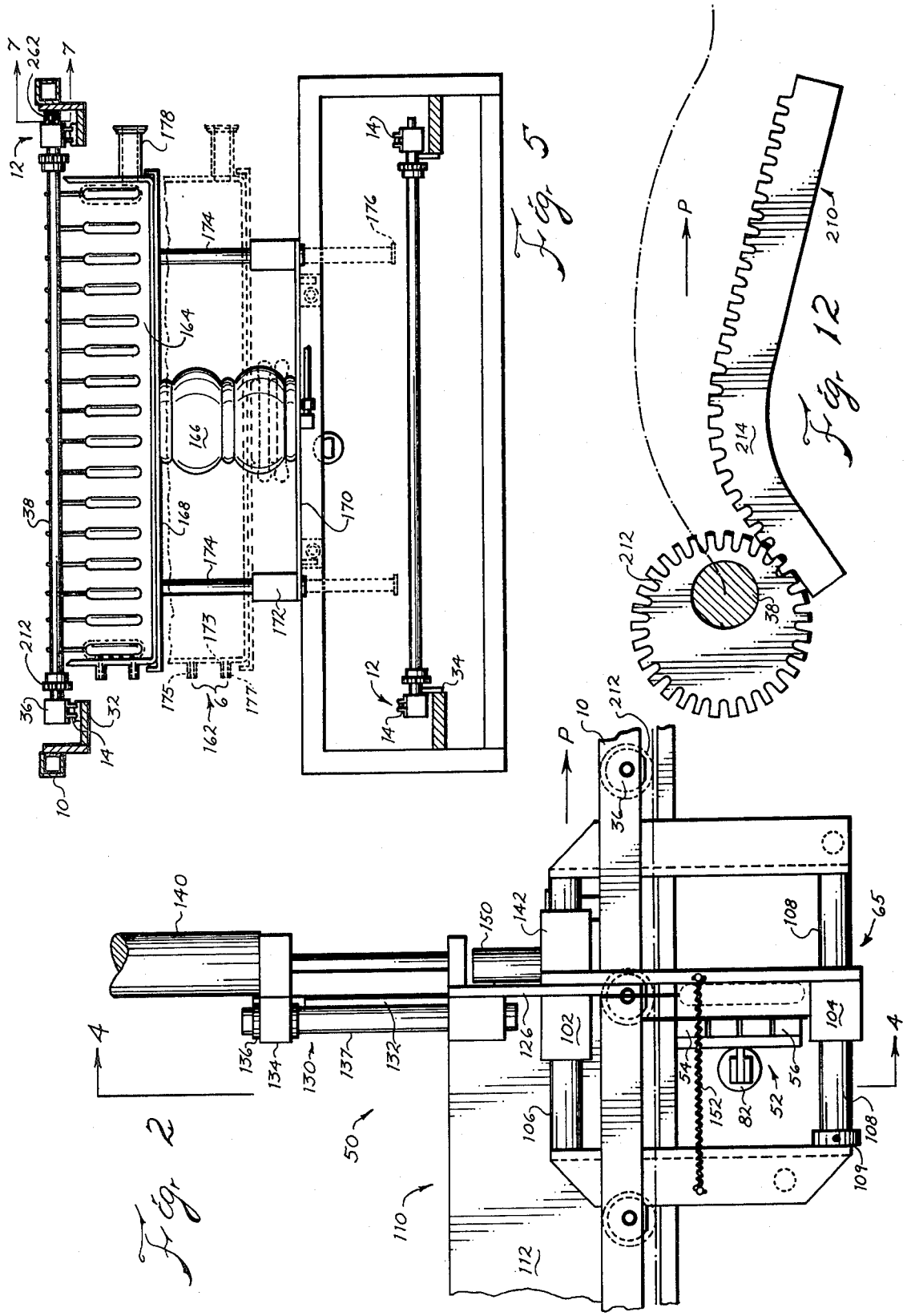

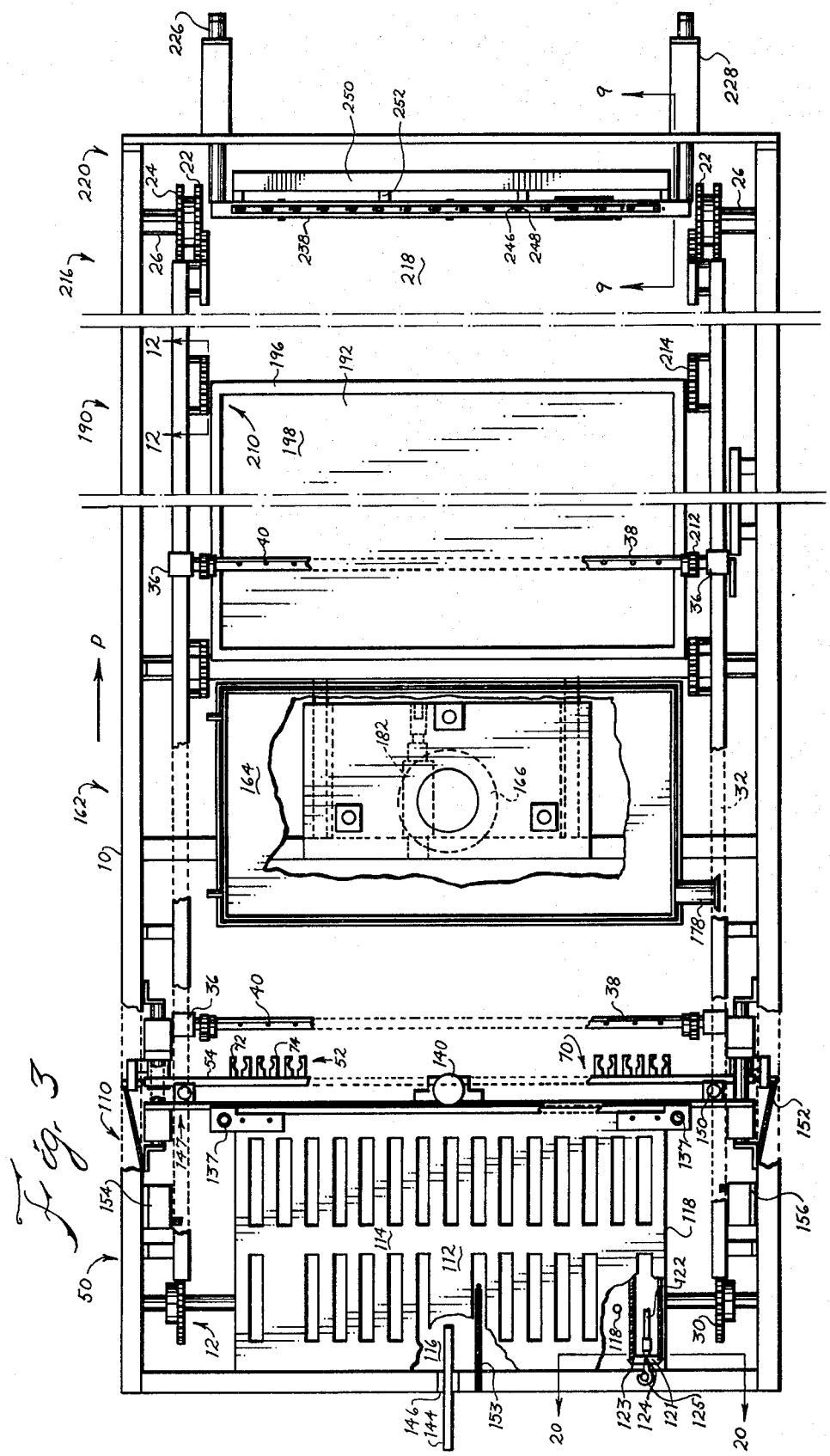

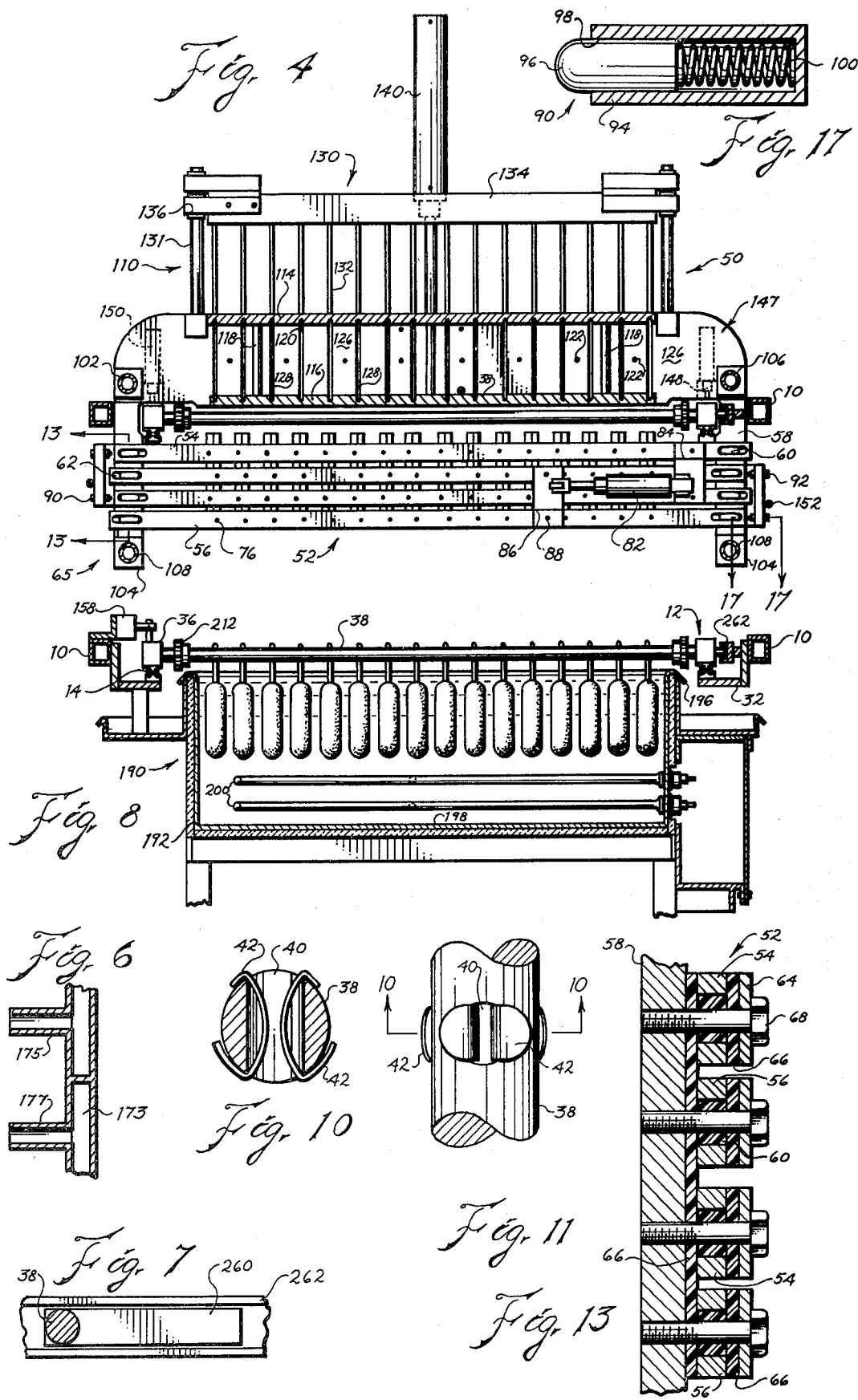

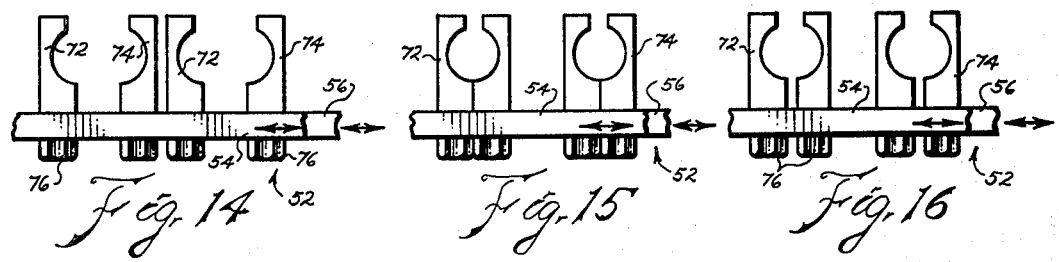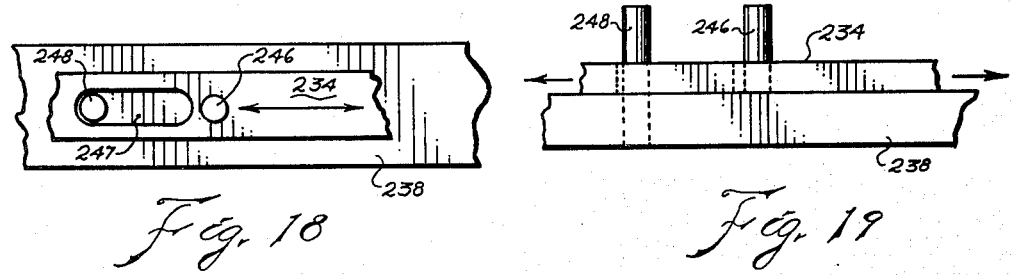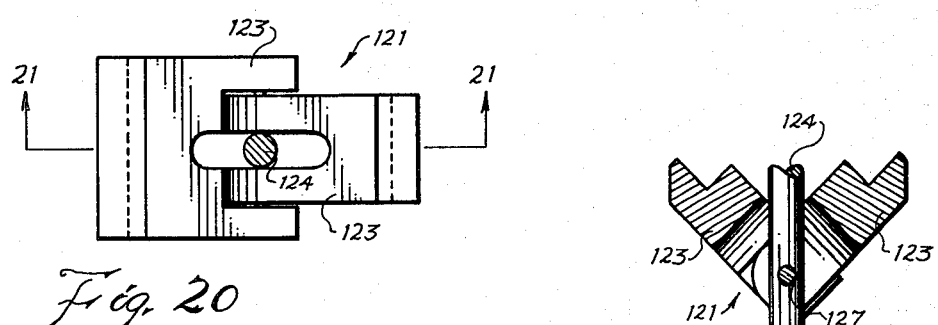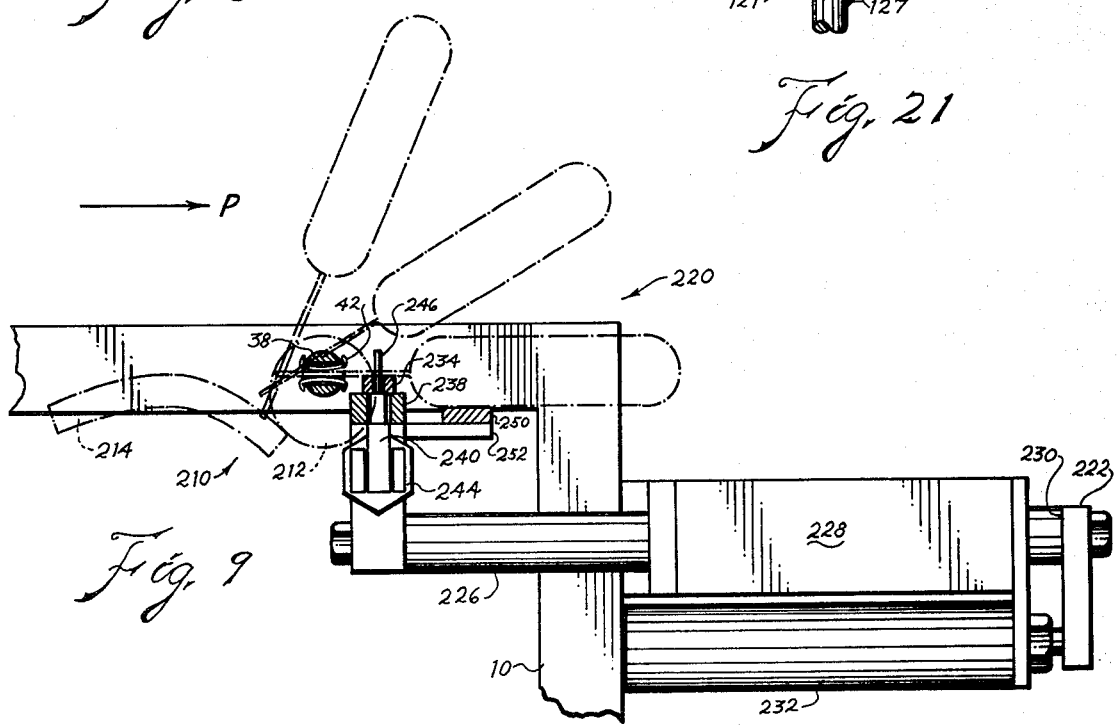

COATED FOOD FRYER

CROSS REFERENCE TO RELATED APPLICATIONS

This invention is a divisional application of my prior application filed on Apr. 3, 1978, Ser. No. 893,011, now U.S. Pat. No. 4,379,795.

BACKGROUND OF THE INVENTION (1) Field of the Invention

This invention relates to foods and more particularly to machines for preparing and cooking food impaled upon a stick.

(2) Description of the Prior Art

A corn dog is a weiner impaled upon a stick and coated with batter which is deep-fried to produce a crisp coating.

Prior to my invention corn dogs were made by inserting the sticks into weiners with a manually operated stick inserter and clamping a plurality of the sticks into a hand operated clamp. A worker grasped the clamp and dipped the food articles in batter. This worker had to be somewhat skilled in order to obtain the desired amount and distribution of batter around the weiner. The worker then placed the clamp on a moving conveyor system with the food articles immersed in hot grease.

After being immersed in the grease for an appropriate time, the clamps were removed manually from the conveyor system and the sticks manually unclamped therefrom. This manual system resulted in non-uniform corn dogs and high labor costs. JENKINS, U.S. Pat. No. 1,706,491, is an example of a cooker for cooking such corn dogs.

ROBB, U.S. Pat. No. 1,960,456, and GLASS, U.S. Pat. No. 3,648,625, disclose apparatuses for making frozen confections or novelties. The sticks of the novelties are clamped by a conveyor, conveyed to a dip tank, dipped in a coating substance, and conveyed to a freezing unit. ROBB employs a displacement of the chain and clamp to dip each of the confections independently and one at a time within the coating substance. GLASS employs a tilting mechanism to lower the confections singly from a raised position slightly below horizontal to a fully lowered position vertically downward to immerse the confections in the coated substance and then to raise the confections to the former lower than horizontal position to remove them from the dip tank.

STICKLE, U.S. Pat. No. 3,948,160, discloses a taco shell fryer in which the forms for holding the tortillas are lowered into hot grease for frying the tortillas. Likewise, WRIGHT ET AL, U.S. Pat. No. 2,585,364, dips frankfurters in batter and then conveys them into hot grease with appropriate displacements of the conveyor chain. Neither STICKLE nor WRIGHT employs sticks impaling the food articles suspended from clamps.

CHOW, U.S. Pat. No. 3,804,955, forms flat meat products in a corrugated form and inserts a stick therethrough. CHOW then serially dips the corrugated meat products suspended from sticks by a conveyor system into a coating substance with a displacement of the conveyor. With another displacement of the conveyor the meat product is lowered into a sauce bath and conveyed through an oven.

Applicant is also aware of SCHWEBS, U.S. Pat. No. 2,903,996 and French Patent S.E.I.L.A. No. 1,016,435 (1952).

LOWRANCE, U.S. Pat. No. 3,316,010 discloses a stick holder mechanism wherein sticks may be placed in elongated bar and held in place by an internal bar reciprocating longitudinally. LOWRANCE U.S. Pat. No. 4,069,960 issued Jan. 24, 1978 discloses an apparatus for inserting sticks into weiners. The weiners are clamped in a holder, and then the sticks are inserted through a stick holder bar and into the weiners. The stick holder bar is evidently similar to the LOWRANCE U.S. Pat. No. 3,316,010 patent noted above.

Also, at the time this divisional application was filed, applicant was aware of patents to CLAY U.S. Pat. No. 2,552,621 and NOUEL U.S. Pat. No. 3,242,249 but do not consider them as pertinent as those specifically discussed above.

Applicant was also aware of the VOM DORP U.S. Pat. No. 4,080,716 issued Mar. 28, 1978, filed Apr. 25, 1977 and COTTRELL U.S. Pat. No. 4,130,936 issued Dec. 26, 1978 and filed Aug. 11, 1977. Applicant does not consider these two patents as pertinent as those noted and also would contest their being prior as to this application.

SUMMARY OF THE INVENTION (1) New and Different Function

I have invented a structure for preparing and cooking corn dogs and other similar deep-fried coated food impaled upon a stick by combining a novel elevation means for moving the food articles from one portion or module of an automated frying machine to another portion with automatic elements on the machine for accomplishing various functions which were previously performed manually.

The novel elevation means includes rotating the food articles about the axis of a rod into which the sticks are clamped while moving the rod perpendicular to its axis from one module to another, thereby elevating a plurality of the food articles above a chain and stick clamp rod and then lowering the food articles into the next module.

I find it more convenient and feasible to perform a complete 360° rotation of the food articles instead of elevating and then lowering the food articles. However, if desired, this elevation could be performed by the simple structure of an arm on the rod contacting a raised track to tilt the food articles about 90° above the lip of the fry tank.

The elements of my invention include (1) an automatic stick inserter which simultaneously clasps the sticks within the rods and inserts the sticks into the weiners, (2) an improved clasp within the rod for clasping the sticks, (3) an improved dipping operation of a coating bin, (4) an improved apparatus for removing the sticks from the clasps in the rods, and (5) an improved apparatus for maintaining the temperature of the grease.

The stick inserter is located within a load module of the machine, and performs insertion of the sticks into the food articles responsive to the alignment of the sticks, clasps in holes or in the rod, and food articles gripped by food grippers. Upon alignment of these elements, a plunger drives the sticks through the clasps, thereby clasping the sticks, and into the food articles. The grippers then release the food articles and the clamp rod moves the food articles on the sticks to a position above a coating bin within a dip module on the machine adjacent the load module.

To accomplish the dipping, I have solved the problem of displacement of the chain which results in undesirable wear and complication of the mechanism. Rather than displace the chain to dip the articles in a coating substance, my invention elevates the batter bin. This also eliminates changing the orientation of the food articles after the insertion of the sticks as they move from the load module to the dip module. In addition, by controlling the duration of the upward stroke of the batter bin and by employing certain horizontal movements of the batter bin once in the elevated position, superior uniformity and distribution of the batter on the food article is achieved.

Once the food articles have been dipped in the batter a desired number of times the food articles are elevated during movement of the clamp rod to allow them to clear the lip of a fry tank having hot grease therein. The fry tank is within a fry module of the machine.

At this point rotation of the food articles through 360° at varying speeds of rotation is beneficial. By increasing the speed or rotation during the first and last parts of the rotation and slowing the rotation while the corn dog is inverted, a more uniform distribution of the coating on the weiner is achieved. The coating collects toward the stick inserted in the food article such that when depended within the grease the batter will again distribute itself in the desired proportions. This helps prevent batter tailings from dropping to the bottom of the fry tank from the food articles.

A thermostatically controlled heating element suspended above the floor of the fry tank maintains the temperature of the grease within desired narrow limits. The coated food articles are deep-fried within the grease during the interval in which the clamp rods transverse the length of the fry tank.

Upon reaching the end of the fry tank, the food articles are again rotated or elevated above the lip of the fry tank and lowered to a substantially downward position within a cooling module of the machine. The rotation permits draining of the grease from portions of the food article.

Upon reaching the end of the frame the food articles are again elevated and lowered to a substantially horizontal position by 270° rotation convenient for stripping or unclasping. The value of rotating the food articles again becomes evident in that it is desirable to eject the food articles with the sticks trailing the food article. The rotation substantially facilitates this unloading by allowing the food articles and sticks to be rotated and rested on an stripper, thereby simplifying the structure necessary for ejection.

The stripping is performed within an unload module of the machine by an stripper arm having stick grippers thereon. The sticks are engaged by the stick grippers and the arm moved on the frame so as to withdraw the sticks radially from the clamp rod. The sticks are then released, thereby dropping the corn dogs onto a receiving tray or conveyor at the end of the frame.

This list of features of my invention is not comprehensive and further benefits and novel features shall appear from the description which follows. It should now be apparent, however, that the total function of my invention far exceeds the total of the functions of the individual elements: the tanks, gears, rods, etc.

(2) Objects of this Invention

An object of this invention is to prepare food articles.

Another object is to prepare deep-fried coated food articles.

Further objects are to achieve the above with a device that is sturdy, compact, durable, simple, safe, efficient, versatile, ecologically compatible, energy conserving, and reliable, yet relatively inexpensive and easy to manufacture, install, adjust, operate and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 1 is a side elevational view of an embodiment of my invention foreshortened and with parts broken away for clarity. The coating bin is shown in an elevated position in broken lines.

FIG. 2 is a side elevational view of an automatic stick inserter thereof.

FIG. 3 is a top plan view, foreshortened and with parts broken away for clarity.

FIG. 4 is a sectional view of the automatic stick inserter taken substantially on line 4—4 of FIG. 2.

FIG. 5 is a sectional view of the coating bin taken substantially on line 5—5 of FIG. 1. Some parts omitted for clarity and the coating bin is shown in a lower position in broken lines.

FIG. 6 is a cross-sectional detail of the cooling water jacket of the coating bin which would be an enlargement of that portion shown by brackets 6 in FIG. 5.

FIG. 7 is a sectional detail of the stabilizer taken substantially on line 7—7 of FIG. 5.

FIG. 8 is a sectional view taken substantially on line 8—8 of FIG. 1.

FIG. 9 is a cross-sectional view of the stripper element taken substantially on line 9—9 of FIG. 3.

FIG. 10 is a cross-sectional view through the clamp rod taken substantially on line 10—10 of FIG. 11.

FIG. 11 is an enlarged partial plan view of a portion of the clamp rod.

FIG. 12 is a detail sectional view of the clamp rod showing a rack and pinion of my invention as taken substantially on line 12—12 of FIG. 3 with a clamp rod positioned before the rack and pinion and showing in broken lines the path followed by the center of the clamp rod.

FIG. 13 is a sectional view of the gripper bars taken substantially on line 13—13 of FIG. 4.

FIGS. 14, 15 and 16 are plan views of the food grippers showing them in the three positions; on FIG. 14 in the full open position, FIG. 15 in the full closed position and FIG. 16 in the load position.

FIG. 17 is a sectional detail of the return spring as taken substantially on line 17—17 of FIG. 4.

FIG. 18 is a top plan fragmental view of the stripper bar.

FIG. 19 is an elevational fragmental view of the stripper bar.

FIG. 20 is a back view of the butterfly clamp taken on line 20—20 of FIG. 3.

FIG. 21 is a sectional view of the butterfly clamp taken on line 21—21 of FIG. 20 with the clamp in the collapsed position.

DESCRIPTION OF THE PREFERRED EMBODIMENT

The corn dog fryer has six major components arranged on frame 10 which has a longitudinal axis. The first component, transport mechanism or means 12, is rotatably connected on the frame 10 and provides for transporting food articles or weiners impaled upon sticks in a process direction shown by arrow "P" along the frame axis through processing areas of the machine. The second component is load module 50 which inserts the sticks into the weiners and clamps the sticks into the transport mechanism 12. The third component is dip module 162 which coats the weiners with the batter or other coating substance. The fourth component is fry module 190 which cooks or deep fries the coated weiner. The fifth component is elevation mechanism 210, which moves the corn dogs from one module to another. The sixth component is stripper module 220 wherein the sticks and weiners with a crispy coating therearound are unloaded from the transport mechanism 12.

Transport Mechanism

The transport mechanism 12 includes a pair of parallel endless transport chains 14 extending on either side of and along the longitudinal axis of the frame 10. Chain motor 16 is located on the frame at an end thereof proximate the stripped module 220. Motor chain 18 connects motor sprocket 20 connected to the drive shaft of the chain motor 16 and drive sprocket 22 attached to transport sprockets 24 by drive axle 26 (FIGS. 1 and 3).

The drive axle 26 is journalled to drive axle bearings located on the frame. Idler sprockets 30 located at appropriate positions on the frame provide for maintainin vertical and lateral position of the chains 14 on the frame 10. The chains 14 travel along the frame 10 and slidably contact upper chain tracks 32, thereby maintaining the chains 14 in a horizontal position proximate the top of the frame 10. The chains 14 rest on lower return tracks 34 proximate the bottom of the frame 10. The return tracks 34 support the chain above the floor. Each track has a wear strip thereon to prevent stretching and wear of the chains 14.

The direction of movement of the chains 14 on the upper chain tracks 32 is from the end of the machine at the load module 50 to the end of the machine at the stripped module 220. This is the process direction indicated by the arrow "P". Then the chains go down, return and up.

Rod connectors 36 are spaced at equal distances along each of the chains 14 with each connector 36 on one chain 14 being directly opposite another connector 36 on the parallel chain 14. Stick clamp means in the form of stick rods 38 are journalled to each pair of the rod connectors 36. The transport chains 14 provide for moving the rods 38 extending transversely of the longitudinal axis of the frame 10 along the longitudinal axis of the frame 10 in the process direction.

Spaced stick slots or hole 40 extend through the stick rod 38. The holes 40 each have a pair of "C" shaped clasps 42 therein. Referring to FIGS. 10 and 11 the clasps 42 may be seen to include a curved strip of spring metal crimped at the ends over the outer surfaces of the rod 38. The crimps serve to retain the clasps 42 within the holes 40. The curved portion of the clasps 42 springably bear against a stick placed therebetween. I prefer to employ sixteen of the stick holes 40 with pairs of the clasps 42 therein spaced along the stick rod 38 in order to process as many corn dogs as feasible with each stick rod 38. The clasps 42 form means for independently clasping the sticks. By independent means each clasp 42 operates indendently of all other clasps 42.

Each of the food articles has article sides, article ends, and an article axis. Each of the sticks has a food end, a clamp end, and a stick axis. Each of the sticks is rectangular in cross section and substantially flat on two sides to facilitate clasping by the clasps 42.

Load Module

The load module 50 includes food clamper 52, stick inserter 110 and alignment mechanism 147. The food clamper or grip means 52 includes food slides or slide bars 54 and 56 slidably mounted with respect to each other within slide mounts 58 (FIGS. 3, 4, 13, 14, 15 and 16). The slide mounts 58 have "TEFLON" lugs 60 fitting within slots 62 in the end of the slides 54 and 56. I prefer to place TEFLON wear strips 66 on the lug and between back up plate 64 and the slide mount 58 to prevent wear of the steel parts and to increase the useful life of the mechanism. In addition, TEFLON resists deterioration because of grease, smoke and the like normally present in such frying operations. The back up plate 64, lugs 60 and TEFLON wear strips 66 are secured to the slide mount by lug bolts 68.

Food grippers include gripper halves 72 and 74. The gripper halves 72 are connected to the food slides 54 and the gripper halves 74 are connected to the food slides 56. The inner surface of each gripper half 72 and 74 conforms to the shape of the food article being processed. For the corn dog fryer, I prefer to employ a concave semi-circular shape for the length of the food grippers to fit the shape of the weiners.

The gripper halves 72 and 74 are each bolted to their respective slides 54 and 56 by gripper bolts 76. Bottom plates (not shown for clarity) are located at the bottom of each pair of gripper halves 72 and 74 and are of sufficient dimensions such that the bottom of the cavity between the food grippers is sealed off. Food articles for this embodiment (weiners), are thus prevented from falling through the bottom of the food grippers. The bottom plates are connected to the bottom slide 56 by plate bolts.

Clamper cylinder 82 interconnects cylinder plates 84 and 86 (FIG. 4). The plates are bolted with bolts 88 to the food slides 54 and 56, respectively. When the cylinder 82 is fully extended the lugs 60 will abut against the end of the slots 62, thereby moving the gripper halves 72 and 74 away from each other. When the cylinder 82 is retracted the gripper halves will move toward one another until the other end of the slots 62 bears against the other end of the lug 60. By adjusting the positions of the slide bars 54 and 56 or the position of the lugs the distance between the food gripper halves 72 and 74 may be adjusted in the closed position thereby insuring proper gripping of the food articles.

As shown by FIGS. 14, 15 and 16, I prefer to employ three positions of the gripper halves 72 and 74. The position shown in FIG. 15, called the grip position, is such that the gripper halves 72 and 74 are brought proximate one another with the cross section of the gripper halves 72 and 74 being slightly less than the cross section of the food article placed therein, thus clamping or gripping the food article between the gripper halves.

The position shown in FIG. 16, called the load position, is such that the gripper halves are spaced apart a greater distance than in the grip position but not so far apart as to allow the food article to exit the space between the fronts of the grippers. In this position the cross section of the area between the grippers is slightly greater than the cross section of the food article.

The position shown in FIG. 14, called the unload position, is such that the gripper halves 72 and 74 are spaced apart a maximum amount which is sufficient to allow the food article placed therein to exit the space between the fronts of the gripper halves 72 and 74.

Spring returns 90 and 92 are connected to the slide mounts 58 opposite the ends of the slides 54 and 56 (FIGS. 4 and 17). The spring returns each have return housing 94, return rods 96 slidably telescoped within return holes 98 in the return housing 94, and return springs 100 within the return holes 98.

The return rods 96 of the spring returns 90 and 92 are located such that when the slide bars 54 and 56 are extended such that the gripper halves 72 and 74 are moved apart; the return rods 96 will engage the ends of the slides 54 and 56, respectively, to move the slides in a first direction such that the gripper halves 72 and 74 are moved to a load position intermediate the unload and grip positions. Thus, the spring returns 90 and 92 provide for placing the slides 54 and 56 and gripper halves 72 and 74 in the load position and the extension and retraction of the cylinder 82 provides for placing the slides 54 and 56 and gripper halves 72 and 74 in the grip and unload positions.

The food clamper 52 is slidably mounted on the frame 10 for alignment purposes described later. Food clamper frame 65, including slide mounts 58, is attached to upper and lower linear bushings 102 and 104 telescoped over upper and lower clamper rods 106 and 108, respectively, rigidly attached to and axial of the frame 10.

The stick inserter or plunge means 110 (FIGS. 2, 3 and 4) includes magazine 112 for holding flat sticks, guide slots 128 for guiding the sticks vertically downwards, and plunger 130 for driving the sticks downward. The magazine 112 has upper and lower plates 114 and 116, respectively, connected by side braces 118 on the sides of the magazine 112. This forms a rectangular cavity between the upper and lower plates 114 and 116. The upper and lower plates 114 and 116 have pairs of vertically aligned stick slots 120 therein which slidably receive the ends of sticks placed therein. Butterfly clamps 121 are resiliently connected to the magazine 112 by rubber tubes 122. The butterfly clamps 121 bear against pairs of the rows of sticks and biases them towards guide plate 126 at the front of the magazine 112.

Each of the butterfly clamps 121 includes stick plates 123 hinged by pin 127 to eye bolt 124. The rubber tube 122 interconnects the guide plate 126 and the eye bolt 124. Packages of sticks may be loaded into the magazine simply by placing the packages of sticks within the stick slots 120 in the upper and lower plates 114 and 116, hooking eye 125 on the eye bolt 124, and pulling the eye 125 toward the rear of the magazine 112, thereby folding the stick plates 123 back as seen in FIG. 21. The stick plates are then extended once they have cleared the end of the packages being loaded. The clamp 121 is engaged with the packages of sticks, thereby biasing all of the sticks within each of slots 120 toward the guide plate 126.

The guide plate 126 is vertically disposed and has guide slots 128 located therein alligned at the ends thereof with the stick slots 120. This forms a receptacle for the sticks biased against the guide plate 126 by the stick plate 123. The upper and lower plates 114 and 116 of the magazine 112 are of sufficient size to enable the loading of many sticks in each slot 120, such that an operator loading sticks may devote his attentions to other activities of the machine. Although sixteen of the slots 120 and 126 are shown, it will be understood that the machine could process more or less sticks and food articles simultaneously.

Plunger 130 is connected to the magazine 112 and includes plunger rods 132 vertically above and aligned with the guide slots 128. The plunger rods 132 are rigidly depended from plunger bar 134. The plunger bar 134 is rigidly connected to plunger bushings 136 telescoped over the plunger slides 137 verticaly disposed and rigidly attached to the magazine 112. Plunger cylinder 140 interconnects the magazine and the plunger bar 134. When retracted the plunger cylinder 140 drives the plunger rods 132 depended from the plunger bar 134 downward within the guide slots 128, thereby driving the sticks within the slots 128 downward.

The sides of the guide plate 126 extend beyond the side braces 118 of the magazine 112. Inserter bushings 102 are connected to the guide plate 126 and are telescoped over the upper rod 106 opposite the upper clamper bushings 142. Magazine rod 144 extends beyond the magazine 112 and rests on magazine support 146 attached to the frame 10. Thus, the inserter bushings 102 and magazine rod 144 and support 146 provide support for and guide the magazine 112 for axial reciprocation along the frame 10. The clamper frame 65 may be brought in contact with the guide plate 126 by appropriate movements of the magazine 112 and clamper 52.

The alignment mechanism or means 147 includes alignment rods 148 connected to alignment cylinders 150. The alignment cylinders 150 are connected to the magazine 112 on each side thereof. When the alignment cylinder 150 is extended the alignment rod 148 obstructs the movement of the stick rod 38 along the frame 10. When the stick rod 38 contacts the alignment rods it slides the magazine 112 along the magazine rod 146 and upper rods 106 until the guide plate 126 contacts the clamper frame 65 and causes it to slide with the magazine 112 and stick rod 38. Once the stick rod 38 engages the alignment rod 148 and the guide plate 126 engages the clamper frame, the sticks in the guide slots 120 will be aligned with the stick slots 40 in the stick rod 38 and the center line of the food articles or weiners within the gripper halves 72 and 74.

Return means in the form of springs 152 connecting the clamper 52 to the frame 10 return the clamper 52. Spring 153 connects the frame 10 and the inserter 110 to position suitable for hand loading the weiners or food articles into the food grippers 70 (FIG. 3). The clamping or gripping of the food articles is initiated by retracting the clamper cylinder 82, and the insertion of the sticks by retracting the plunge cylinders 128, with microswitches located on the frame 10 such that as a rod connector 36 passes and engages each microswitch an appropriate function occurs.

It may be seen from the previous description that the stick rods are the critical timing feature of this particular embodiment. The stick rod 38 to be loaded contacts the alignment rods 148 on the cylinders 150, thereby sliding the magazine 112 and guide plate along the frame axis stretching spring 153. The guide plate 126 contacts the clamper frame 65 and moves it stretching the spring 152, thereby aligning the sticks, slots 40 and food articles as described previously.

Immediately after the alignment occurs, a sensed rod connector 36 contacts load microswitch 154 located on the frame at the load end thereof. The cam shape of the rod connector 36 maintains the load microswitch in the depressed or closed position for the duration of the travel of the stick rod 38 thereon past the load microswitch 154. Upon the closing of the load microswitch 154, the clamper cylinder 82 extends, thereby causing gripper halves 72 and 74 to grip the food articles. Simultaneously the plunger cylinder 140 retracts, thereby driving an insertion end of the sticks into the food articles and through the holes 40.

Unload microswitch 156 is located at another position on the frame 10 at the load end thereof, performs an equivalent function for releasing the food articles and placing the gripper halves 72 and 74 in the unload position, extending the plunger cylinder 140, and retracting alignment cylinder 150 to disengage the rod 148 from the stick rod 38 being loaded. It may be seen that the speed of the chain is such that the unload microswitch 156 will be depressed by the rod connector 36 a period of sufficient duration to allow completion of the operations being performed.

It should be noted that the clamper cylinder 82 is of the type that it is in a neutral position when neither the load nor unload microswitch 154 nor 156 is depressed.

Dip Module

The dip module 162 has coating bin 164 vertically oscillated by bin elevator 166, which interconnects bin frame 168 and elevator frame 170. The elevator frame 170 has vertically oriented elevator bushings 172 connected thereto. Elevator rods 174 vertically oriented and rigidly connected to the bin frame 168 are telescoped through the elevator bushings 172. The elevator rods have stops 176 on the ends thereof which limit the upward travel of the rods 174 within the elevator bushings 172. The bin elevator 166 is an air stroke actuator (which is basically an inflatable rubber bellows) which when inflated elevates the bin 164 upward and when deflated allows the bin 164 to be lowered. Each up and down movement of the coating bin 164 is a dip stroke.

It is desirable to maintain the batter or coating substance within the coating bin 164 at a cool temperature to insure that the batter sticks to the weiner and rapidly expands on contact with hot grease in the fry module. Therefore, the coating bin 164 has water jacket 173 in the walls thereof through which water is circulated during operation of the coating bin 164 (FIG. 6). Water inlet 175 and outlet 177 connect the water jacket 173 to a source of water and a sink of water respectively. The coating bin 164 also has feed opening 178 in the wall thereof for feeding additional batter or coating substance into the coating bin 164.

In order to obtain the appropriate period of immersion of the food article in the coating substance or batter within the coating bin 164, I prefer to employ dip or bin microswitch 158 (shown in FIG. 8 for clarity) on the frame at the load end thereof to activate the elevator 166 to elevate the bin 164. When the dip microswitch 158 is closed the elevator 166 elevates the bin and maintains it at the top of a dip stroke while the dip microswitch 158 remains closed. When opened by disconnection with the rod connectors 36, the elevator 166 is deactivated to lower the bin 164 and permits another stick rod and plurality of weiners to be positioned above the bin 164.

For this particular embodiment, the coating bin 164 is elevated approximately six inches (15 cm.) to immerse the food article in the batter or coating substance. The level of batter within the bin 164 may be adjusted by varying the input rate of batter through the feed opening 178 to insure that the food article is completely coated. Thus for the period in which the food article is gripped by the food grippers 70, the food articles depended from the stick rods 38 will be immersed in batter. Upon release of the food article by the food gripper 70 the coating bin will again be lowered.

I have discovered that it is extemely beneficial to jerk the coating bin 164 in the process direction during the immersion of the food articles in the batter. Upon elevation of the coating bin 164 as the food articles move through the batter with the stick rods 38 pulled by the chains 14 the food articles leaves a wake in the batter and there is a build up of batter in front of the food article in the process direction. By jerking the batter bin in the direction of movement of the stick rods, the movement of batter is greater than the movement of the food article and batter coating substance builds up on the rear of the food article opposite the process direction.

The elevator frame 170 has horizontally oriented jerk bushings 179 connected thereto. Jerk rods 180 are rigidly attached to the frame 10 and telescoped through the jerk bushings 179. Jerk cylinder 182 interconnects the elevator frame 170 and the frame 10 such that when the jerk cylinder 182 is extended, the elevator frame 170, and therefore the coating bin 164, are jerked along the frame axis.

When the jerk cylinder 182 is extended, the coating bin 164 is jerked in the direction of movement (process direction) of the stick rods 38. When retracted, the coating bin 164 is jerked in the opposite direction. I prefer to employ jerk microswitch on the frame 10 to extend and retract the jerk cylinder 182. When the bin 164 is at the top of the dip stroke the jerk microswitch is closed by a rod connector 36 to activate the jerk cylinder 182. The cylinder 182 is extended to quickly move the coating bin 164 in the process direction. After the return of the bin 164 to the lowered position, the stick rod disconnects from the microswitch 160 and the jerk cylinder 182 is retracted to return the coating bin 164 to its former or ready position.

Fry Module

The fry module 190 includes fry tank 192 connected to the frame 10 with hot grease therein. The level of the grease within the fry tank 192 is such that the food article depended from the stick rod 38 will be completely immersed therein. Therefore, lip 196 of the fry tank 192 must be above the level of the grease. In addition, tank floor 198 must be at least deeper than the length of the food articles. I also prefer to place electrical heating elements 200 within the hot grease and suspended above the floor 198 about 25 mm (1 inch) to heat the grease (FIG. 8).

I have discovered that the grease heated with this structure requires less power to maintain the high temperatures required, does not burn tailings and other debris on the bottom of the tank floor, as do tanks heated from the bottom. My structure also maintains a more uniform temperature throughout the tank. I prefer to thermostatically control the heating elements 200 with temperature control connected to the frame 10 away from the fry tank and temperature sensor located in the grease at the end of the fry tank 192 proximate the coating bin 164. I have discovered that inasmuch as the greatest temperature loss is encountered immediately after immersion of the coated weiner in the hot grease and that this position best senses the temperature requirements of the fry tank 192.

Although not absolutely necessary for the functioning of my invention, I have found it desirable to include cooling module 216 between the unload module 220 and the fry module 190 within which the fried food articles are cooled and drained. The cooling module has open space 218 to allow the corn dogs to cool and drain prior to unloading. If desired, cooling fans or the like may be placed therein.

Flip Mechanism

The elevation mechanism 210 includes pinions or pinion gears 212 connected to and mounted around the stick rod 38, and racks 214 mounted on the frame 10 proximate an obstacle or boundary between two modules and proximate the chains 14. As the stick rod 38 is moved longitudinally along the frame 10 by the chains 14 the pinions 212 will engage the racks 214 and rotate the food articles and revolve the rod 38 about the clamp axis of the pinions 212. This rotation will elevate the food article above the obstruction and above the chains 14.

I have discovered that it is desirable to increase the speed of rotation of the food articles such that the food article is flipped out of one of the modules, rotated more slowly at the top of the rotation, and flipped quickly into the adjacent module. Therefore, I have found the following structure to be most advantageous in accomplishing this desired result. The pinion 212 is eccentric of the stick rod 38. The axis of the stick rod is in the process direction of the axis of the pinion at the rest position as shown (FIG. 12). In this manner, the speed of rotation of the stick rod 38 is increased during the first portion of the rotation, decreased until the middle of the rotation and then increased for the final portion of the rotation.

I have also discovered that problems are experienced with slack in the chain that permits the pinion gear 212 to be disengaged from the rack 214 during travel of the chain 14. Therefore, it is preferable to elevate the rod 38 during the rotation, especially when the food articles on the sticks are almost horizontal. Therefore, I prefer to employ a rack shaped as shown in FIG. 12, such that the pinions 212 elevate the rods 38, thereby stretching the chain 14 and maintaining the pinions 212 in contact with the racks 214. FIG. 12 shows also the path of the stick rod 38 in dashed lines with respect to the normal orientation of the stick rod and the rack 214.

Three elevation mechanisms 210 are employed to move the food articles. The first elevation mechanism 210 is located at the obstruction of the fry tank or boundary between the coating or dip module 162 and the fry module 190 such that after the second elevation of the coating bin 164, the food article is rotated as previously described and immersed within the hot grease 194 in the fry tank 192.

I prefer to place another elevation module 210 at the boundary between the fry module 190 and the cooling module 216. Thus, as the stick rod 38 with the sixteen food articles approaches the end of the fry tank 192, the food articles are rotated out of the hot grease 194 to a position vertically depending from the stick rods 38 within the cooling space 218.

I prefer to employ the third elevation module 210 at the boundary between the cooling module 216 and the unload module 220. As the food article reaches the end of the cooling module 216, the food articles are rotated approximately 270° to a substantially horizontal position convenient for unclamping the sticks from the stick rods 38. Upon reaching the horizontal position, the pinions 212 are disengaged from a shortened rack 214 (shown in phantom lines in FIG. 9.).

Unload Module

The unload module 220 includes stripper frame 222. The stripper frame 222 slidably attaches to the end of the frame 10 substantially parallel to the stick rods 38 (FIGS. 1, 3 and 9). Stripper rods 226 extend axially of the frame 10 and are rigidly attached to the stripper frame 222. Stripper bushings 228 are rigidly connected to the frame 10. The rods 226 are telescoped in the stripper bushings 228. The stripper rods 226 have stops 230 on the ends thereof for limiting the travel of the stripper rods 226 within the stripper bushings 228.

Stripper cylinders 232 interconnect the frame 10 with the stripper frame 222. When retracted, the cylinders 232 move the stripper frame 222 and rods 226 within the bushings 228 toward the end of the frame 10 and toward the stick rod 38 in the position convenient for unclamping. When retracted, the stripper cylinders 232 extend the stripper frame 222 toward the stick rods 38.

Stripper slide 234 is slidably telescoped on the support bar 238 (FIGS. 9, 18 and 19). Support bar 238 is rigidly attached to the forward end of the stripper rods 226 and, thus, in effect to the stripper frame 222. Thus, it might be said that the support bar 238 with the stripper bars 226 and the stripper frame 222 together form this frame. Cylinder arm 240 is rigidly connected to the bottom of the stripper slide 234 and extends through an arm slot in the support bar 238. Slide cylinder 244 interconnects the cylinder arm 240 and the support bar 238.

When the slide cylinder 244 is extended, stick gripper rods 246 vertically extending from the stripper slide 234 are brought proximate stick gripper rods 248 vertically extending from the support bar 238. The stick gripper rods 248 extend from the support bar 238 through rod slots 247 in the stripper slide 234. The gripper rods 246 and 248 are aligned. The gripper rods 248 remain stationary and the stick gripper rods 246 reciprocate back and forth. It may be seen that the rod slots 247 are of sufficient dimensions that the stripper slide 234 may reciprocate freely. When the slide cylinder 244 is in the extended position, the stick gripper rods 246 and 248 grip sticks clasped within the stick rod 38. When the slide cylinder 244 is in the extended position and the stripper cylinders 232 are retracted, the sticks are withdrawn radially from the clasps 42 within the stick holes 40. A stop is welded to the underside of the support bar 238 against which the cylinder arm 240 abuts when the rods 246 and 248 are slightly less apart than the width of the stick. When the slide cylinder 244 is retracted, the stick gripper rods 246 and 248 will release the sticks after the stripper cylinders 232 have been retracted. A receiving tray or conveyor (not shown) is conveniently attached to the end of the frame 10 for receiving the corn dogs or coated food articles released by the stick grippers 246 and 248. It will be understood that this tray can be adapted for automatic packaging systems or for manual unloading as desired. Slap bar 250 is attached to the support bar 238 by a plurality of fingers 252. When the corn dogs are laid in a horizontal position, as seen in FIG. 9, by the rotation of the stick rods 238 the dog itself hits the slap bar 250. This prevents the stick from breaking as the stick hits the top of the stripper slide 234. It will be understood that the rack 214 no longer causes the stick rod 38 to rotate but the momentum of the weiner otherwise would cause difficulty at this point.

In order to perform the appropriate operation of the unload module, I prefer to employ microswitches contacted by the stick rods 38 similar to the operation of the load and coating modules. Therefore, the ready position for unloading with the unload module 220 is with the stripper cylinders 232 in the fully extended position. Therefore, prior to completion of the rotation of the corn dogs from the cooling module 216, one of the stick rods 38 at the unloading end of the frame as indicated in the drawing contacts stripper microswitch (not shown for clarity). After contact of the stripper microswitch the sripper cylinders 232 are fully contracted.

Upon completion of the rotation of the corn dogs from the cooling module 216, the sticks are rested horizontally on the stripper slide 238 and slap bar 250. Immediately after the sticks are rested horizontally on the stripper slide 234, one of the rod connectors 36 contacts gripper rod microswitch positioned on the frame 10 at the unload end thereof, thereby closing the gripper rod microswitch. This causes the slide cylinder 244 to extend thereby causing the stick gripper rods 246 and 248 to engage and grip the sticks. Simultaneously the stripper cylinders 232 are extended to move the slide frame rigidly away from the stick rod 38 being unloaded, thereby withdrawing the sticks from the clasps 42 within the stick holes 40. It will be understood that the slide cylinder 244 is of such construction that it completes its operation before the stripper cylinders 232 begin their retraction. Thus, the stick gripper rods 246 and 248 grip the sticks prior to retraction of the stripper cylinders 232.

After the stripper cylinders 232 are fully extended the rod connector 36 which contacted the gripper rod microswitch is disconnected therefrom by movement of the chains 14, thereby opening the microswitch and releasing the slide cylinder 244. The releasing of the slide cylinder 244 causes the stick gripper rods 246 and 248 to disengage and ungrip the sticks. The released corn dogs fall on the receiving tray or conveyor conveniently positioned at the end of the frame 10.

It will be apparent that the stripper cylinders 232 will remain in the extended position until another rod connector 36 contacts the stripper microswitch. Those with ordinary skill in the food processing machine art would be able to make necessary pneumatic mechanical and electrical connections to accomplish the above operations with the microswitches in the positions indicated.

Stabilizer

Stabilizer or arm 260 is rigidly attached to and extends perpendicular to an end of each of the stick rods 38. The arm 260 is perpendicularly and trailingly oriented with respect to the center lines of the holes 40 within the stick rods 38. The arm 260 slidably engages channels 262 attached to the frame 10 at a position above and outboard of one of the upper chain tracks 32. The channels 262 are positioned on the frame 10 at the following positions.

One of the channels 262 is placed within the load module 50 such that the arm 260 is horizontal and the holes 40 within the stick rod 38 vertically oriented during the insertion of the sticks through the holes 40 and between the clasps 42 (FIG. 4). Another channel 262 is positioned adjacent the dip module 162 such that the holes 40 and the sticks therein are vertically oriented during the dipping of the food articles into the batter (FIG. 5). A third channel 262 is positioned adjacent the fry module such that the food articles with batter or coating substance therearound are oriented vertically within the hot grease (FIG. 8). It should be apparent that there are no channels at the positions of the elevation modules inasmuch as the arm 260 engaging the channel 262 would prevent rotation of the stick rod 38.

OPERATION

Therefore, with the elements assembled as described above, the operation of this embodiment of my invention may be seen to occur as follows. The chain is moved along the frame axis by starting the motor 16. The controls for starting the motor and the electrical circuitry required to connect the microswitches to the operating parts of the machine have not been disclosed inasmuch as those with ordinary skill in the art of food preparation machines will be familiar with and able to make the necessary connections. Prepackaged rows of the sticks are loaded into the magazine 112 and the butterfly clamp 121 placed upon the rows of sticks in the magazine to bias them against the guide plate 126. For this embodiment, I have employed sixteen corn dogs per stick rod. Therefore, sixteen packs of sticks will be within the guide slots 128.

Batter or coating substance is placed within the coating bin 164. The heating elements 200 are activated by setting temperature control at approximately 171° C. (340° F.). Once these steps have been performed the machine is ready prepare and cook corn dogs.

The weiners are manually loaded into the food clamper 52 between the gripper halves 72 and 74, which are maintained in the load position by the spring return 90 and 92. One of the stick rods 38 approaches the guide plate of the stick inserter, and the extended alignment rod 148 is engaged by the stick rod 38. The stick rod 38 slides the magazine 112 axially along the frame 10 extending the spring 153.

The ends of the guide plate 126 of the stick inserter 110 engage the ends of the clamper frame 65, thereby aligning the sticks within the guide slots 128, the holes within the stick rod 38, and the food articles between the gripper halves 72 and 74. The gripper moves along with the stick rod 38 extending the spring 152. The stabilizing arm 260 on the stick rod 38 engages the channel 262 to maintain the holes 40 within the stick rod 38 in a vertical orientation.

Immediately after the alignment of the sticks, the stick holes 40, and the food articles, one of the sensed rod connectors 36 closes the insert microswitch 154, thereby retracting the clamper cylinder 82 to place the gripper halves 72 and 74 in the grip position. Simultaneously, the closing of the insert microswitch 154 retracts the plunger cylinder 140, thereby driving the plunger rods 132 within the guide slots 128 against the sticks and inserting them through the stick holes 40 in the stick rod 38 into the food articles within the grippers 70. The clasps 42 clasp the sticks within the stick holes 40.

Immediately thereafter one of the sensed rod connectors 36 contacts the unload microswitch 156, thereby (1) extending the plunger cylinder 140, removing the plunger rods 132 from within the guide slots and allowing the biasing of another set of sixteen sticks within the sixteen guide slots 128; (2) extending the clamper 82 to place the gripper halves 72 and 74 in the unload position; and (3) retracting the alignment cylinder 150 and disengaging the alignment rod 148 with the stick rod 38.

Immediately after the alignment rod is disengaged from the stick rod 38, the stick rod 38 will convey the food articles and sticks from between the gripper halves 72 and 74. The return springs 152 and 153 will return the clamper frame 65 and the magazine 112 to the ready positions. The clamper frame 65 is stopped by the stops 109 on the lower rods 108.

After the unload microswitch 156 has been disconnected from the rod connector 36, the alignment cylinder 150 will extend the alignment rod 148 in readiness for another stick rod 38 to be loaded. The clamper cylinder 82 will be placed in a neutral position, thereby permitting the spring returns 92 to place the gripper halves 72 and 74 in the load position.

Weiners are then loaded into the grippers 70 preparatory to a repetition of the above steps. Packages of sticks are also periodically loaded into the magazine 112, by repositioning the butterfly clamps 121 as previously described.

The stick rod 38 conveys the food articles impaled upon the sticks depended upon the stick rod 38 to a position within the dip module 162 over the coating bin 164. Immediately after the food article is positioned above the coating bin 164, one of the sensed rod connectors 36 contacts the bin microswitch 158 to actuate the bin elevator 166. The coating bin 164 is elevated to the top of a first dip stroke and maintained thereat until the sensed rod connector 36 is removed from the bin microswitch 158, thereby opening it and returning the coating bin 164 to the bottom of the dip stroke. I find the time delay for the rod connector 36 to pass the bin microswitch 158 closely approximates the proper duration of immersion of the weiner in the batter or coating substance.

While the coating bin 164 is at the top of the dip stroke and while the bin microswitch 158 is closed, another sensed rod connector 36 contacts the jerk microswitch, thereby extending the jerk cylinder 182 and jerking the coating 164 in the process direction. The jerk cylinder remains in the extended position.

After the bin microswitch 158 is disconnected and the coating bin 164 is lowered, the jerk microswitch will be disconnected and the jerk cylinder 182 retracted to place the coating bin in the ready position for the next elevation thereof. As another pair of sensed rod connectors 36 contact the bin and jerk microswitches, a second dip stroke occurs, thereby double dipping the weiners prior to elevation or rotation into the fry module.

As the stick rod 38 approaches the obstacle of the fry tank 192, the pinions 212 engage the racks 214 on the frame 10 and the coated weiners are rotated from a position over the coating bin 164 to within the hot grease 194. The stabilizer arm 260 engages the arm guide 262 on the frame 10 proximate the chain 14 to maintain the weiners with batter therearound in a vertically downward position within the hot grease 194. By maintaining the weiner in a vertical orientation, the frying of the batter and weiner is uniform throughout.

The stick rod 38 conveys the weiners through the hot grease. Upon reaching the obstacle of the end of the fry tank 192, the pinion 212 engages another of the racks 214 on the frame 10 at the obstacle between the cooling module 216 and the fry module 190. The food articles are rotated from the hot grease 194 to within the cooling space 218. The stick rod 38 conveys the corn dogs through the draining and cooling area 216 to a position proximate the unload module 220.

The pinion 212 engages another of the racks 214 at the boundary between the unload module 220 and the cooling module 216. It will be noted that the rack 214 at this position is shorter in order to rotate the food articles approximately 270°. This shorter rotation allows the pinion 212 to be disengaged from the rack 214 to rest the product horizontally upon the stripper slide 234 and slap bar 250 of the unload module 220.

With the sticks resting horizontally on the stripper slide 234, the slide cylinder 244 is retracted, thereby gripping the sticks with the stick gripper rods 246 and 248. Simultaneous with the gripping of the sticks, the stripper cylinders 232 are extended, thereby quickly moving the sticks and weiners away from and radially of the slide rod 38, thereby withdrawing the sticks from the clasps 42 within the stick holes 40.

After the retraction of the stripper cylinders 232, the slide cylinder 244 is extended to disengage the stick gripper rods 246 and 248 from the sticks, thereby releasing them. The cooked corn dogs are then removed from the receiving tray manually, or from the conveyor automatically, and packaged. Preceding the rotation of the corn dog from the cooling module, the stripper cylinders 232 are retracted to place the slide frame in the ready position for unloading sticks from another stick rod 38.

Therefore, I have invented this novel and useful apparatus and method for preparing coated food articles impaled upon sticks. I prefer to prepare sixteen corn dogs for each stick rod. However, more or less corn dogs could be produced per stick rod or clamp means in the event of different operating conditions, e.g. automatic loading and unloading.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In a machine for preparing and frying coated food articles impaled upon sticks including
   a. clamp means for clasping said sticks,
   b. a fry tank with hot grease therein,
   c. a coating bin with a coating substance therein, the improved structure comprising in combination with the above:
   d. a frame having a frame axis,
   e. said frame having attached thereto in order along the frame axis
      (i) a load module,
      (ii) a coating module,
      (iii) a fry module, and
      (iv) an unload module, f. said coating bin connected to said frame within said coating module, g. said fry tank connected to said frame within said fry module, h. a chain on the frame for horizontally moving the clamp means from the load module to the coating module to the fry module to the unload module and down and return and up to the load module, j. said clamp means is on the chain, k. elevating means on each end of the fry tank for elevating the sticks and food thereon above the chain and above obstacles to movement of said food articles, m. dip means connected to said frame for elevating the coating bin and dipping said food articles in said coating bin, and n. unload means connected to said frame for unclasping said sticks within said unload module.

2. The invention as defined in claim 1 further comprising:

o. a heating element suspended within said liquid cooking medium approximately 25 cm above the floor of said fry tank, and p. said heating element being thermostatically controlled, q. said heating element providing means for heating said liquid cooking medium to approximately 171° centigrade without excessively heating the floor of said fry tank.

3. The invention as defined in claim 1 further comprising:

o. said clamp means including
   (i) a rod having an axis
   (ii) a plurality of stick holes evenly spaced along and extending diametrically through said rod, and
   (iii) individual clasps for clasping said sticks within each of said holes, p. each of said clasps being a C-shaped strip of resilient material fixed within said stick hole.

4. The invention as defined in claim 3 further comprising:

q. a stabilizer arm connected to one end of said rod perpendicular to the holes within said rod adapted to slide in a channel on the frame forming a stabilizer guide, r. said stabilizer arm providing means for maintaining said sticks and said food articles in a substantially downward vertical position.

5. The invention as defined in claim 1 wherein:

o. said stripper means functions by gripping said sticks and withdrawing them from said clamp means, p. said stripper means including
   (i) elongated stick slides slidably mounted with respect to each other,
   (ii) stick grippers attached to said stick slides,
   (iii) slide extension means connecting said stick slides for sliding at least one of said stick slides with respect to the other so that
   (iv) said slide extension means when extending moves said stick grippers apart to release said sticks and when retracting moves said stick grippers together to grip said stick,
   (v) said stick slides and said slide extension means being mounted on an stripper arm, and
   (vi) said stripper arm being mounted on said frame such that said stripper arm is movable in alignment with said sticks, and
   (vii) arm drive means for reciprocating said stripper arm, and q. a receiver to receive said coated food when released by said stripper means.

6. The invention as defined in claim 1 further comprising:

o. automatic insert means connected to said frame within said load area for impaling said food articles upon said sticks each of which has a food end and clamp end and clasping said sticks with said clamp means including
   (i) grip means for gripping the sides of said food articles responsive to one of said clamp means being at a load position on said frame,
   (ii) plunge means for driving said food end of said stick into said food article responsive to one of said clamp means being at an insert position on said frame,
   (iii) said plunge means also providing the function of driving said sticks through clasps on said clamp means, thereby clasping the clamp end of said sticks within said clasps, and
   (iv) alignment means for aligning said clamp means, said food articles within said grip means, and said sticks within said plunge means responsive to one of said clamp means being proximate said plunge position, p. said grip means and said plunge means being axially slidably mounted on said frame;

q. said alignment means including
   (i) a grip tab on said grip means engaged by said clamp means such that said grip means moves axially with said clamp means when said food articles with said grip means and stick holes within said clamp means are aligned,
   (ii) a magazine tab on the plunge means engaged by said clamp means such that when said plunge means and said clamp means move axially of said frame said sticks within said plunge means are aligned with said stick holes within said clamp means,
   (iii) plunger initiation means for activating said plunge means responsive to alignment of said clamp means, said grip means and said plunge means, and
   (iv) return means for axially moving said grip means and said plunge means back to initial grip and plunge positions.

7. The invention as defined in claim 1 further comprising:

o. feed means connected to said bin for feeding said coating substance from a source to said bin such that an adequate level of coating substance within said bin is maintained, p. said coating bin being movably connected to a frame, q. said clamp means being horizontally movably mounted on said frame in a process direction above said bin with said food articles impaled on said sticks depended therefrom, r. dip means for elevating and lowering said bin
   (i) to a top of a dip stroke at which point said food articles on sticks clamped in said clamp means are dipped in said coating substance, and (ii) to a bottom of said dip stroke at which point said food articles are above said coating substance,
s. said dip strokes being periodic such that in a coating period during which said clamp means are above said bin at least one stroke will occur,
t. said dip means being axially slidably mounted on said frame,
u. said dip means further including jerk means interconnecting said bin for moving said bin along said frame axis in said process direction from a rest position,
v. said jerk means also providing for returning said bin to the rest position.

8. The invention as defined in claim 1 further comprising:
o. said clamp means having a horizontal clamp axis transverse of the frame axis,
p. said elevating means including clamp rotation means for revolving said clamp means about said clamp axis.

9. In a machine for preparing coated food articles impaled upon sticks including
a. clamp means for clasping said sticks,
b. a coating bin with a coating substance therein;
the improved structure for automatically dipping said food articles suspended from said clamp means into said coating bin comprising in combination with the above:
c. feed means for feeding coating substance from a source to said coating bin such that an adequate level of said substance within said coating bin is maintained,
d. said coating bin being movably connected to a frame,
e. said clamp means being horizontally movably mounted on said frame in a process direction above said bin with said food articles impaled on said sticks depended therefrom, and
f. means on said frame for moving said coating bin vertically relative to said frame and horizontally relative to said frame and to said clamp means.

10. The invention as defined in claim 9 wherein said means for moving includes
g. jerk means interconnecting said coating bin and said frame for quickly moving said bin horizontally in a process direction.

11. The invention as defined in claim 9 wherein said means for moving includes
g. dip means for elevating and lowering said bin to a top of a dip stroke at which point said food articles on sticks clamped in said clamp means are dipped in said coating substance and to a bottom of said dip stroke at which point said food articles are above said coating substance,
h. said dip strokes being periodic such that in a coating period during which said clamp means are above said bin at least one stroke will occur.

12. The invention as defined in claim 11 further comprising:
j. said dip means being axially slidably mounted on said frame,
k. said dip means further including jerk means interconnecting said coating bin and said frame for quickly moving said bin along said frame axis in said process direction from a rest position,
m. said jerk means also providing for returning said bin to the rest position.

* * * * *